United States Patent
Brandao, Jr. et al.

(10) Patent No.: US 6,912,951 B2
(45) Date of Patent: Jul. 5, 2005

(54) JUICE EXTRACTOR WITH ORIFICE TUBE

(75) Inventors: Helio Brandao, Jr., Lakeland, FL (US); Gregory W. Schrader, Lakeland, FL (US)

(73) Assignee: FMC Technologies, Inc., Chicago, IL (US)

( * ) Notice: Subject to any disclaimer, the term of this patent is extended or adjusted under 35 U.S.C. 154(b) by 52 days.

(21) Appl. No.: 10/430,792

(22) Filed: May 6, 2003

(65) Prior Publication Data

US 2004/0221748 A1 Nov. 11, 2004

(51) Int. Cl.$^7$ .............................. B30B 9/03; A23N 1/00
(52) U.S. Cl. ...................... 100/35; 100/98 R; 100/127; 100/213; 99/509
(58) Field of Search .............................. 100/37, 98 R, 100/104, 108, 127, 213, 110, 126, 35; 99/495, 496, 509, 510, 513; 403/109.1; 285/145.1, 390

(56) References Cited

U.S. PATENT DOCUMENTS

| | | | |
|---|---|---|---|
| 2,649,730 A | 8/1953 | Hait | 100/37 |
| 2,780,988 A | 2/1957 | Belk et al. | 100/37 |
| 2,856,846 A | 10/1958 | Belk | 100/108 |
| 3,236,175 A | 2/1966 | Belk | 100/108 |
| 3,736,865 A | 6/1973 | Hait | 100/98 |
| 4,154,163 A * | 5/1979 | Niemann | 100/98 R |
| 4,376,409 A | 3/1983 | Belk | 99/509 |
| 4,700,620 A | 10/1987 | Cross | 99/510 |
| 4,922,813 A | 5/1990 | Compri | 99/510 |
| 5,170,700 A | 12/1992 | Anderson et al. | 99/510 |
| 5,970,861 A | 10/1999 | Suter et al. | 100/37 |
| 5,992,311 A | 11/1999 | Suter et al. | 100/37 |
| 5,996,485 A | 12/1999 | Suter et al. | 100/37 |
| 6,568,319 B2 * | 5/2003 | Schrader et al. | 100/108 |
| 2002/0166465 | 11/2002 | Schrader et al. | 100/98 |

* cited by examiner

Primary Examiner—Derris H. Banks
Assistant Examiner—Jimmy T Nguyen
(74) Attorney, Agent, or Firm—Allen, Dyer, Doppelt Milbrath & Gilchrist, P.A.

(57) ABSTRACT

A juice extractor includes a strainer tube mounted to receive juice and pulp of fruit. An orifice tube has opposing first and second ends. The first end is inserted in and moveable within the strainer tube. A rigid sleeve is formed from a material that resists wear and is received within the first end. A drive mechanism engages the orifice tube and reciprocates the orifice tube within the strainer tube and applies pressure on the juice and pulp within the strainer tube for separating the juice and pulp.

32 Claims, 4 Drawing Sheets

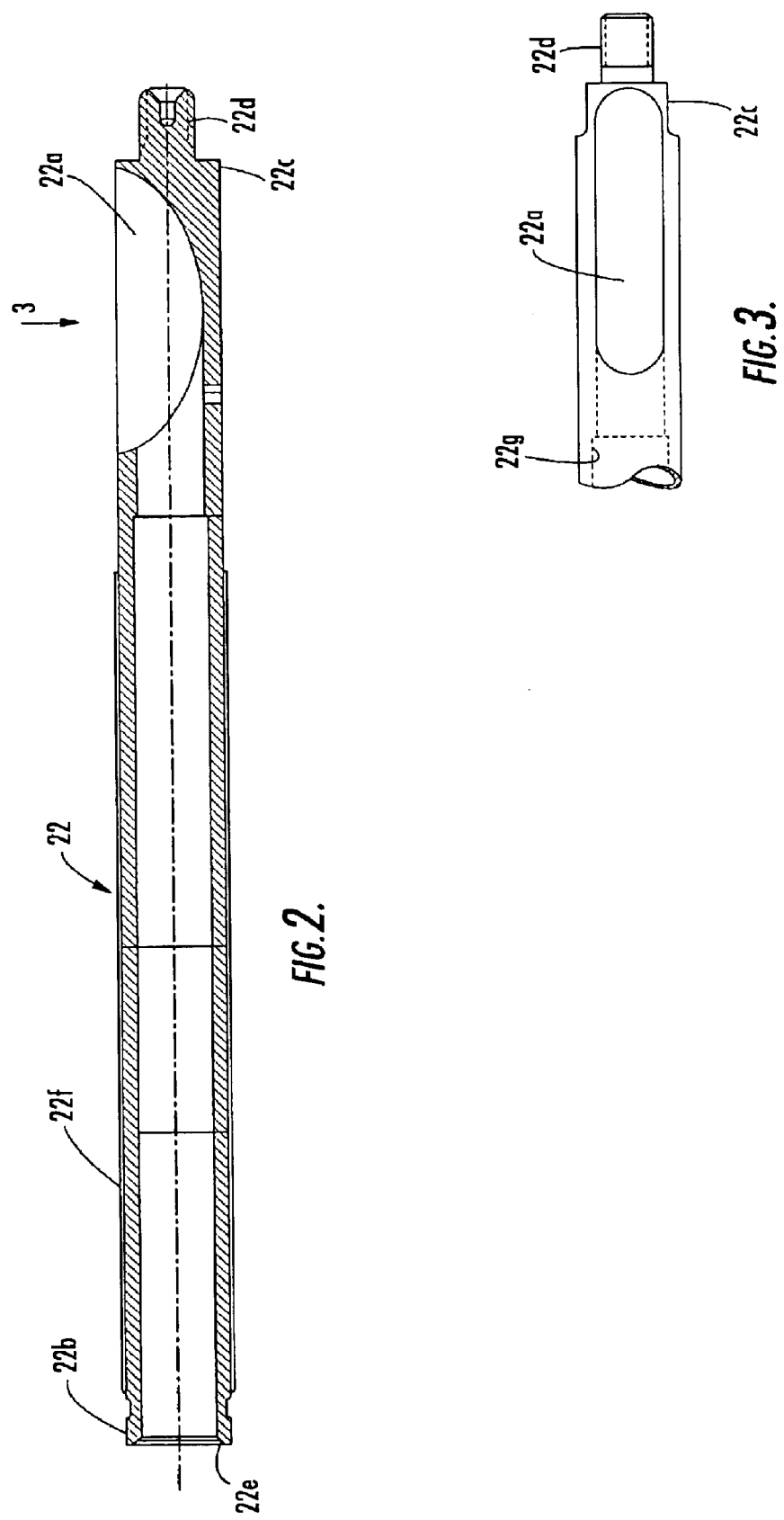

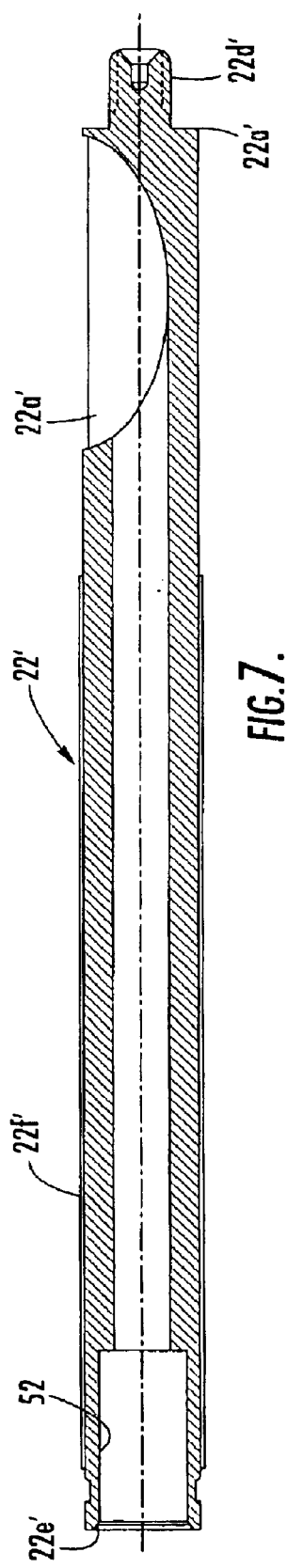
FIG. 7.
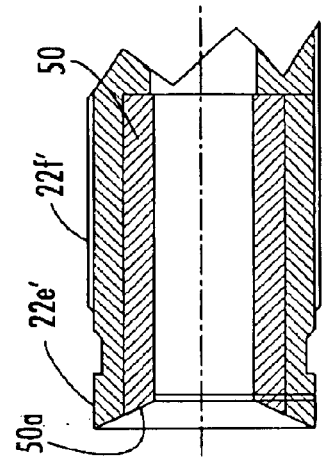
FIG. 10.
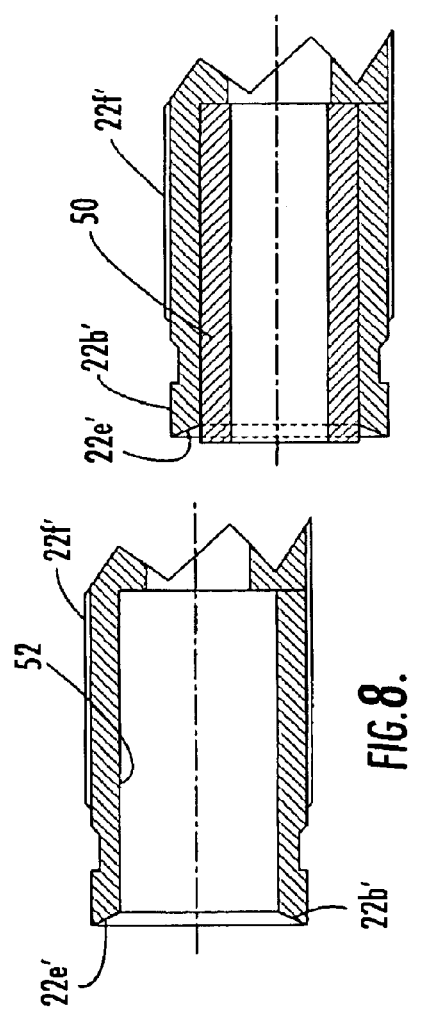
FIG. 9.
FIG. 8.

JUICE EXTRACTOR WITH ORIFICE TUBE

FIELD OF THE INVENTION

This invention relates to the field of juice extractors, and more particularly, this invention relates to a juice extractor having an orifice tube moveable within a strainer tube.

BACKGROUND OF THE INVENTION

A well known juice extractor design is disclosed in U.S. Pat. No. 2,649,730 to Hait, and assigned to the present assignee, the disclosure which is hereby incorporated by reference in its entirety. In this type of vertically arranged juice extractor, upper and lower cups support a fruit, vegetable or similar product. The sides of both upper and lower cups have fingers that intermesh and interdigitate together. The upper cup descends into the lower cup against the fruit or vegetable and is pressed against a circular, lower cutter positioned at the top of a strainer tube adjacent the lower cup and an upper cutter positioned in the upper cup. Plugs are cut into the top and bottom portions of the fruit or vegetable as the interdigitating fingers of the two cups mesh together. Inner portions of the fruit, such as the pulp and juice, are forced down into the strainer tube positioned within a manifold. An orifice tube moves upward in the strainer tube and applies pressure into the internal portion of the strainer tube to separate juice and pulp within the strainer tube. Any juice and juice sacks flow through holes of the strainer tube into a juice manifold. Those internal portions of the fruit having particle sizes larger than the holes in the strainer tube are forced through a discharge opening in the orifice tube and then discharged.

In one type of orifice tube, the internal profile of the orifice tube at the first end engaging the fruit includes a taper (bevel), which wears because of the normal abrasion created by engaging the first end with the fruit or vegetable. This internal wear on the orifice tube at its first end can reduce the yield after a period of time. Typically, the tube end wears in a conical fashion, rounding the corners at its internal diameter as it wears. Testing of various orifice tubes in different stages of wear during extractor operation has established that the wearing of the corners has a significant impact on yield.

Orifice tube inserts, known as restrictors, have long been used commercially to restrict access through the orifice tube and increase pressure within the strainer tube during extractor operation. The restrictors are positioned at a medial portion in the orifice tube, but do not extend to the first end that engages the fruit or vegetable. As a result, restrictors have not protected the first end (or entrance) of the orifice tube against wear. These restrictors generally have not been manufactured from a hardened material.

Window-type orifice tubes, such as disclosed in U.S. Pat. No. 3,236,175 and published U.S. patent application Ser. No. US-2002-0166465-A1, the disclosures which are hereby incorporated by reference in their entirety, use "windows" formed in the orifice tube to engage the fruit or vegetable and enhance juice recovery. In the published '465 patent application, a two-piece orifice tube has a screw-in, hardened window portion. The orifice tube described in the '175 patent is stainless steel with an outer plastic sleeve. Some commercial improvements to an orifice tube coat the external surface of the tube with a stellite alloy and machine the tube after coating it to increase wear resistance on the external surface.

Although these prior art restrictors, stellite surfaces, two-piece orifice tubes and other structures provide some advantages depending on the extractor application, for a standard orifice tube having a small taper (bevel) at the entrance end, wear occurs, decreasing yield.

SUMMARY OF THE INVENTION

It is therefore an object of the present invention to provide an orifice tube having increased yield and is not prone to abrasion at its first end engaging the fruit or vegetable during extractor operation.

It is yet another object of the present invention to overcome the disadvantages of prior art orifice tubes as described above.

The present invention is advantageous and provides a juice extractor having a strainer tube mounted to receive juice and pulp of fruit. An orifice tube is moveable within the strainer tube and includes opposing first and second ends. The first end is inserted in and moveable within the strainer tube. A rigid sleeve is formed from a material that resists wear and received within the first end to strengthen the first end against unwanted abrasion and wear. A drive mechanism engages the orifice tube and reciprocates the orifice tube within the strainer tube and applies pressure on the juice and pulp within the strainer tube for separating the juice and pulp.

In another aspect of the present invention, the orifice tube and rigid sleeve are beveled at the first end to enhance juice and pulp separation during extractor operation. The first end of the orifice tube includes a counterbore to receive the rigid sleeve. The orifice tube extending beyond the counterbore and the rigid sleeve preferably both have an internal diameter substantially the same.

In yet another aspect of the present invention, the rigid sleeve is formed from a metallic material, a ceramic material, or other similar, hardened material. The rigid sleeve can be pressed fit within the orifice tube, fixed by an adhesive within the orifice tube, or secured by other means.

An orifice tube is also disclosed that is adapted to be received and reciprocated within a strainer tube of a juice extractor for separating juice and pulp within the strainer tube during extractor operation.

A method of the present invention is disclosed of forming an orifice tube that is adapted to be received within a strainer tube of a juice extractor and reciprocated therein for separating juice and pulp within the strainer tube. A tubular member is formed having first and second ends with the first end configured to be inserted within a strainer tube. A rigid sleeve is formed from a material that resists wear and received within the first end. A method of repairing the profile at a first end of an orifice tube is also disclosed.

BRIEF DESCRIPTION OF THE DRAWINGS

Other objects, features and advantages of the present invention will become apparent from the detailed description of the invention which follows, when considered in light of the accompanying drawings in which:

FIG. 2 is a sectional view of an orifice tube commonly used in the juice extractor shown in FIG. 1, having a first end that can be worn during use, and can be repaired in accordance with the present invention.

FIG. 3 is a plan view of the second end of the orifice tube looking in the direction of arrow 3 in FIG. 2 and showing the discharge opening of the orifice tube.

FIG. 7 is a sectional view of an orifice tube of the present invention and showing the counterbore at the first end.

FIG. 8 is an enlarged sectional view of the counterbore in the first end of the orifice tube shown in FIG. 7.

FIG. 9 is an enlarged sectional view of the first end of the orifice tube shown in FIG. 7 receiving the rigid sleeve.

FIG. 10 is an enlarged sectional view of the first end of the orifice tube shown in FIG. 7 and showing the rigid sleeve seated within the counterbore and a formed bevel at the first end aligned with the bevel of the rigid sleeve to form a common bevel configuration at the first end of the orifice tube

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 4:
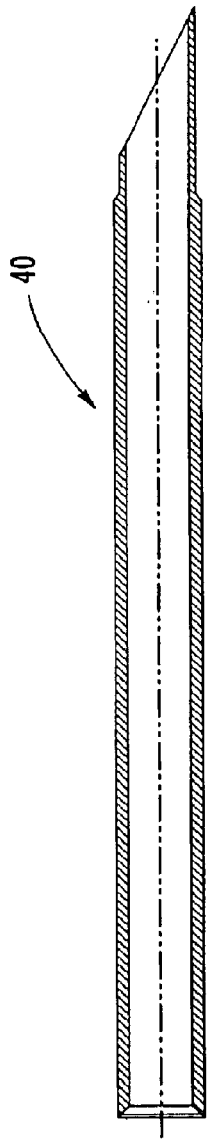
FIG. 4 is a sectional view of a prior art restrictor that is inserted within a medial portion of the orifice tube such as the type shown in FIG. 2.
Figure 5:
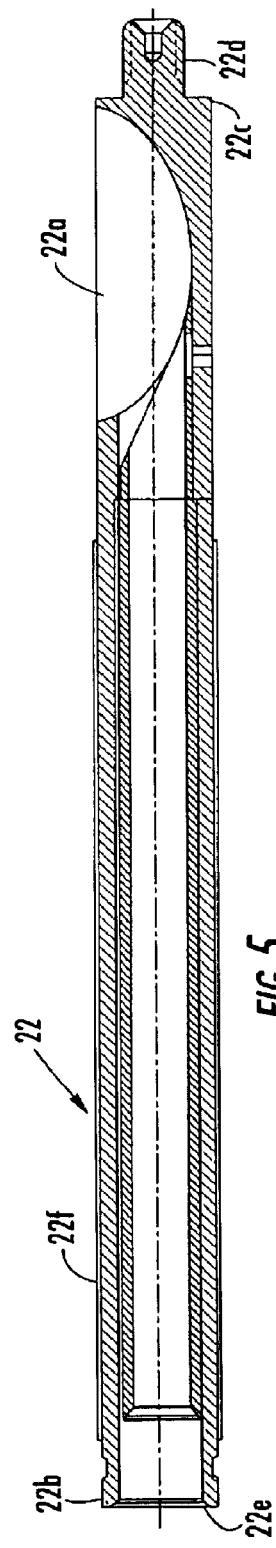
FIG. 5 is a sectional view of the orifice tube having the prior art restrictor inserted within a medial portion and leaving the first end that engages fruit or vegetable prone to wear.
Figure 6:
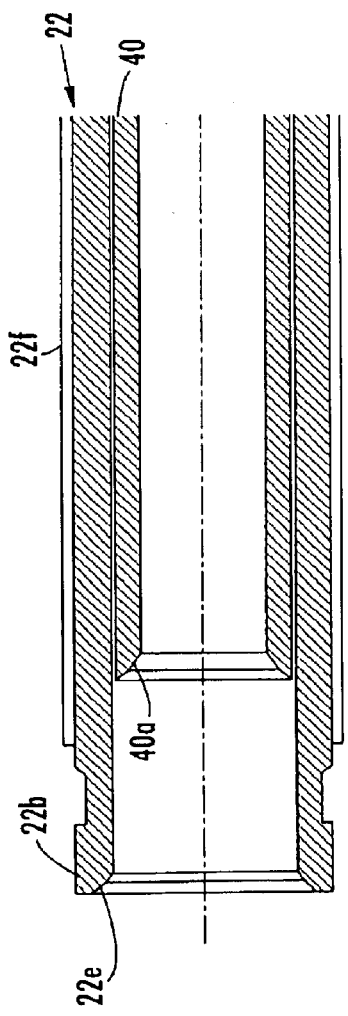
FIG. 6 is an enlarged sectional view of a portion of the restrictor and orifice tube.

The present invention advantageously provides additional support and wear resistance at the orifice tube's first end that engages fruit or vegetables. It is advantageous over prior art orifice tubes using a prior art restrictor as shown in FIGS. 4–6. A rigid sleeve is received within the first end and has an end aligned with the first end of the orifice tube. The term "rigid sleeve" is not limited to an annular configuration. The rigid sleeve can be annular configured, C-shaped, a spoke-type insert, a circular periphery and non-circular interior, and other configurations that perform the intended function. A bevel on both the orifice tube first end and the rigid sleeve are aligned to form a common bevel configuration at the first end. A new orifice tube can be designed with the rigid sleeve of the present invention, or a worn orifice tube can be repaired by forming a counterbore at the first end and inserting and seating the rigid sleeve within the counterbore. Some tubes that are otherwise in good condition can be reworked by drilling out the first end of the tube to form a counterbore and replacing that section with the rigid sleeve, which is formed preferably from a hardened material, such as a metallic or ceramic material. The rigid sleeve can be pressed fit within the orifice tube or fixed by an adhesive. It could even be threaded within the counterbore. Also, new tubes can be made to include the hardened, rigid sleeve and prolong the operational life of an orifice tube during extractor operation.

Figure 1:
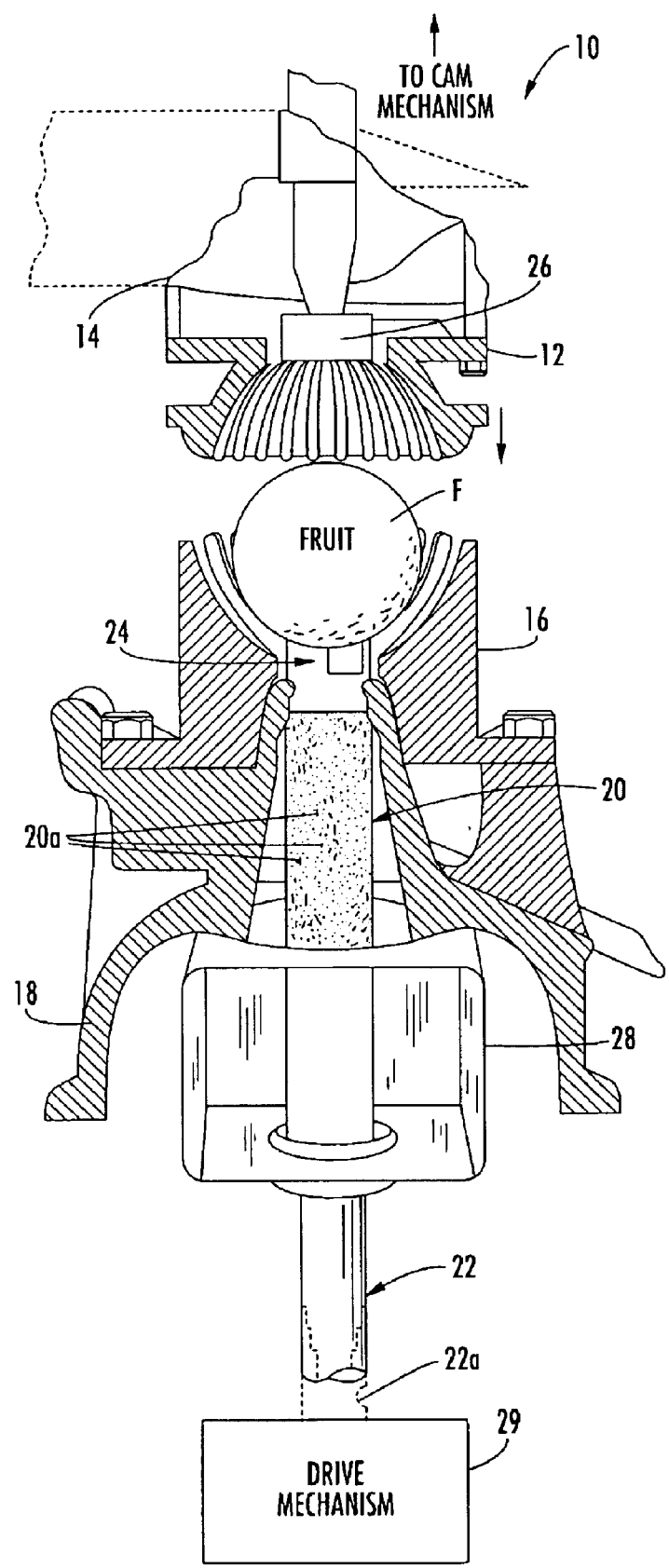
FIG. 1 is a partial isometric and sectional elevation view of a portion of a juice extractor showing upper and lower cups, a strainer tube and orifice tube.

For purposes of description, an elevation and partial isometric and sectional view of a juice extractor that can be used with the present invention is shown in FIG. 1. Although a vertical juice extractor is illustrated, it should be understood that different types of juice extractors can be used with the present invention, including those having horizontally moving cups and other similar mechanisms.

The basic juice extractor is illustrated at 10 and includes an upper cup 12 mounted on a common crossbar 14, which could interconnect other cups of other juice extractor units (not shown), as known to those skilled in the art. Naturally, the juice extractor 10 could be used as a single juice extractor unit or a ganged with a plurality of juice extractors. The crossbar 14 moves in a fixed up and down direction by a cam mechanism (not shown) mounted in the top portion of the juice extractor. The lower cup 16 is rigidly positioned to a frame 18. The upper and lower cups 12, 16 are formed as interdigitated cups having fingers that intermesh together when the upper cup 12 is moved into the lower cup 16.

The upper and lower cups 12, 16, the prefinisher strainer tube 20, the orifice tube 22 and associated components form one juice extractor unit. The cam mechanism drives the upper cup into the lower cup, and as this occurs, any fruit or vegetable is pressed against a circular lower cutter 24 formed as a tube and located at the top of the strainer tube 20. This cutter 24 cuts a plug in the bottom of the fruit to allow internal portions of the fruit access to the strainer tube 20. A circular upper cutter 26 cuts a plug in the top of the fruit to permit separation of peel from internal portions of the fruit, such as the pulp.

As the fingers of the upper and lower cups 12, 16 interdigitate or mesh together, the inner portions of the fruit, such as any pulpy juice, is forced down into the strainer tube 20 contained within a juice manifold 28. In the early phase of the extraction cycle, the upper cup moves downward to cause pressure on the fruit such that top and bottom plugs are cut. Because of the profile of the interdigitating cups, the fruit or other supported body, such as a vegetable, is totally supported, and will not burst, but obtain an even squeeze.

As the extraction cycle continues, pressure increases on the fruit, causing some internal portions to form a bottom plug and move into the strainer tube 20. In one aspect, when there is a peel clearance, the peel is discharged between the upper cup 12 and cutter 26. Upon completion of the extraction cycle, internal portions of the fruit are positioned in the strainer tube 20. At this time, the orifice tube 22 moves upward, placing pressure on the contents of the strainer tube. The juice and juice sacks, because of their small particle size, flow through the holes 20a of the strainer tube and into the juice manifold. Those internal portions of the fruit having particle sizes larger than the holes in the strainer tube are forced through a discharge opening 22a in the orifice tube and are discharged.

The peel surfaces do not contact the juice and any contamination by the extractives in the peel are minimized. The peel falls away outside the juice manifold 28 and can be collected by a peel screw conveyor under an extractor platform or other means (not shown) and discharged into a hopper or other waste disposal container and conveyed by truck or trailer to a desired destination for further processing, if desired.

FIG. 2 is a sectional view of an orifice tube 22 such as described with reference to FIG. 1, and showing the entire length of the orifice tube and the discharge opening 22a. The orifice tube includes first and second ends 22b, 22c. The discharge opening 22a is located at the second end 22c. A drive extension 22d at the second end is used for securing the orifice tube to the drive mechanism 29 by a manner known to those skilled in the art.

The orifice tube 22 is typically formed of a metallic material and at its first end 22b, includes an internal bevel (or taper) 22e, such as better shown in the sectional view of FIG. 6. This bevel 22a provides an orifice configuration at the point where the first end 22b engages the fruit or vegetables and improves yield during extractor operation. A coating 22f can be positioned on the outer surface of the orifice tube as shown in FIG. 2, and in greater detail in FIG. 6. The coating 22f increases wear resistance on the external surface of the orifice tube 22. The coating 22f could be a stellite alloy that is machined after initial application onto the orifice tube. Part of the tube interior at its medial section can include a slightly enlarged diameter section 22g (FIG. 3), which receives a restrictor 40 formed as an elongate tube, as shown in FIG. 4, and inserted within the orifice tube, as shown in FIG. 5. The restrictor 40 restricts access of juice and pulp entering the first end 22b of the orifice tube and allows additional pressure to be exerted within the strainer tube.

FIG. 6 shows an enlarged sectional view of the first end 22b and medial section 22g of the orifice tube 22 and showing the restrictor positioned inwardly within the orifice tube and having an end spaced from the orifice tube first end 22b. This restrictor 40 is typically not hardened, but usually is rigidly formed. FIG. 6 illustrates how the first end 22b of the orifice tube, even with the restrictor 40, is unsupported and prone to wear over time during extractor operation. The inside corner defined by the bevel 22e at the first end often wears, decreasing extractor yield.

The present invention advantageously solves this problem by using a rigid sleeve 50 that is constructed from a hardened material and received in the orifice tube 22' at the first end 22b' and preferably in a counterbore 52, as shown in FIGS. 7 and 8. The counterbore 52 can be formed in new tubes or drilled in older, worn tubes to allow repair of the worn tubes. For purposes of explanation, common reference numerals with prime notation are used to describe common elements in FIGS. 7–10 with those common elements shown in FIGS. 2–6.

As shown in FIGS. 9 and 10, the rigid sleeve 50 is an insert formed as a short stub member and inserted within the counterbore 52. The rigid sleeve 50 includes a bevel 50a, that is configured to be aligned with the bevel 22e on the first end 22b of the orifice tube to form one beveled configuration at the first end 22b' as shown in FIG. 10.

In one aspect of the present invention, the rigid sleeve 50 is preferably made of a hardened material, such as a metallic or ceramic material. An example of a metallic material that can be successfully used as a rigid sleeve 50 of the invention is 17-4 pH stainless steel. Naturally, many other hardened or rigid materials that withstand wear can be used for the present invention. The rigid sleeve 50 can be pressed fit into the orifice tube or secured by an adhesive, such as Loctite 609. The rigid sleeve 50 could also be secured by threads formed in the counterbore 52.

Not only can a new orifice tube have the rigid sleeve, but older worn tubes can be repaired by removing the orifice tube 22' from the strainer tube and juice extractor, drilling the counterbore 52 at the first end 22b' (FIG. 8), inserting the rigid sleeve within the counterbore (FIG. 9), and "seating" the rigid sleeve within the counterbore 52 (FIG. 10). The rigid sleeve is dimensioned such that the interior diameter of the orifice tube beyond the counterbore is about the same internal diameter of the rigid sleeve. Also, a contiguous bevel is formed at the first end by the bevel 22e' located on the first end of the orifice tube and the bevel 50a located on the rigid sleeve, which aligns with the orifice tube bevel.

With the present invention, orifice tubes that typically are discarded after many hours of use can now be reworked and new orifice tubes can be designed for extended operational life.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A juice extractor comprising:
   a strainer tube mounted to receive juice and pulp of fruit;
   an orifice tube having opposing first and second ends, wherein said first end is inserted in and movable within the strainer tube and a rigid sleeve formed as a short stub member and from a material that resists wear and received within the first end, wherein the first end of the orifice tube and an end of the rigid sleeve are aligned; and
   a drive mechanism engaging said orifice tube for reciprocating the orifice tube within the strainer tube and applying pressure onto juice and pulp within the strainer tube for separating the juice and pulp.

2. A juice extractor according to claim 1 wherein said orifice tube and rigid sleeve are beveled at the first end to enhance juice and pulp separation during extractor operation.

3. A juice extractor according to claim 1 wherein said first end of said orifice tube includes a counterbore to receive said rigid sleeve.

4. A juice extractor according to claim 3 wherein said orifice tube extending beyond the counterbore and said rigid sleeve have an internal diameter substantially the same.

5. A juice extractor according to claim 1 wherein said rigid sleeve is formed from a metallic material.

6. A juice extractor according to claim 1 wherein said rigid sleeve is formed from a ceramic material.

7. A juice extractor according to claim 1 wherein said rigid sleeve is pressed fit within said orifice tube.

8. A juice extractor according to claim 1 wherein said rigid sleeve is fixed by an adhesive within said orifice tube.

9. An orifice tube that is adapted to be received and reciprocated within a strainer tube of a juice extractor for separating juice and pulp within the strainer tube during extractor operation, said orifice tube including first and second ends, wherein said first end is configured to be inserted within the strainer tube and a rigid sleeve formed as a short stub member and from a material that resists wear and received within the first end such that the first end of the orifice tube and an end of the rigid sleeve are aligned.

10. An orifice tube according to claim 9 wherein said orifice tube and rigid sleeve are beveled at the first end to enhance juice and pulp separation during extractor operation.

11. An orifice tube according to claim 9 wherein said first end includes a counterbore to receive said rigid sleeve.

12. An orifice tube according to claim 11 wherein said orifice tube beyond the counterbore and said rigid sleeve have an internal diameter substantially the same.

13. An orifice tube according to claim 9 wherein said rigid sleeve is formed from a metallic material.

14. An orifice tube according to claim 9 wherein said rigid sleeve is formed from a ceramic material.

15. An orifice tube according to claim 9 wherein said rigid sleeve is pressed fit within said orifice tube.

16. An orifice tube according to claim 9 wherein said rigid sleeve is fixed by an adhesive within said orifice tube.

17. A method of forming an orifice tube that is adapted to be received within a strainer tube of a juice extractor and reciprocated therein for separating juice and pulp within the strainer tube comprising the steps of:

forming a tubular member as the orifice tube having first and second ends, wherein the first end is configured to be inserted within a strainer tube; and securing a rigid sleeve formed as a short stub member and from a material that resists wear within the first end such that the first end of the orifice tube and end of the rigid sleeve are aligned.

18. A method according to claim 17 and further comprising the step of forming a bevel at the first end on the orifice tube and the rigid sleeve to enhance separation of juice and pulp during extractor operation.

19. A method according to claim 17 and further comprising the step of forming a counterbore in the orifice tube at the first end for receiving the rigid sleeve.

20. A method according to claim 19 and further comprising the step of forming an internal diameter of the rigid sleeve substantially the same as the inner diameter of the orifice tube that extends beyond the counterbore.

21. A method according to claim 17 and further comprising the step of forming the rigid sleeve from a metallic material.

22. A method according to claim 17 and further comprising the step of forming the rigid sleeve from a ceramic material.

23. A method according to claim 17 and further comprising the step of securing the rigid sleeve within the orifice tube by a pressed fit.

24. A method according to claim 17 and further comprising the step of securing the rigid sleeve within the orifice tube by an adhesive.

25. A method of repairing the profile at a first end of an orifice tube that is received within a strainer tube of a juice extractor and reciprocated therein for separating juice and pulp within the strainer tube during extractor operation comprising the steps of:

removing the orifice tube from the strainer tube and juice extractor; and securing a rigid sleeve formed as a short stub member and from a material that resists wear within the first end such that the first end of the orifice tube and end of the rigid sleeve are aligned.

26. A method according to claim 25 and further comprising the step of forming a bevel at the first end on the orifice tube and on the rigid sleeve for enhancing separation of juice and pulp during extractor operation.

27. A method according to claim 25 and further comprising the step of forming a counterbore in the orifice tube at the first end for receiving the rigid sleeve.

28. A method according to claim 27 and further comprising the step of forming an internal diameter of the rigid sleeve substantially the same as the inner diameter of the orifice tube that extends beyond the counterbore.

29. A method according to claim 25 and further comprising the step of forming the rigid sleeve from a metallic material.

30. A method according to claim 25 and further comprising the step of forming the rigid sleeve from a ceramic material.

31. A method according to claim 25 and further comprising the step of securing the rigid sleeve within the orifice tube by a pressed fit.

32. A method according to claim 25 and further comprising the step of securing the rigid sleeve within the orifice tube by an adhesive.

* * * * *